United States Patent [19]

Liu et al.

[11] 4,081,962

[45] Apr. 4, 1978

[54] DYNAMIC WAVE ENERGY EXTRACTION SYSTEM

[76] Inventors: Francis C. Liu, 123 W. Loop Dr., Camarillo, Calif. 93010; Kwang Ta Huang, 7241 Mesa Cir., Ventura, Calif. 93003

[21] Appl. No.: 735,726

[22] Filed: Oct. 26, 1976

[51] Int. Cl.² ............................................. E02B 9/08
[52] U.S. Cl. ...................................... 60/501; 114/210; 417/328; 417/337
[58] Field of Search ................. 60/495, 497, 500, 501, 60/504, 505, 507; 114/205, 210, 293, 294; 115/4, 5; 290/53; 417/328, 330, 334, 335, 337

[56] References Cited

U.S. PATENT DOCUMENTS 3,696,251 10/1972 Last et al. ............................. 290/53

FOREIGN PATENT DOCUMENTS 228,914 11/1925 United Kingdom .................. 60/497

Primary Examiner—Allen M. Ostrager
Assistant Examiner—Stephen F. Husar
Attorney, Agent, or Firm—Richard S. Sciascia; Joseph M. St.Amand; Darrell E. Hollis

[57] ABSTRACT

A dynamic wave energy extraction system utilizing a suspended weight to extract energy from ocean waves. A spring-biased floating sheave is disposed to move with respect to a pair of guide posts attached to a ship. A cable having a submerged weight attached to one end thereof passes across the sheave and attaches at the other end to the ship. The spring, cable and weight are tuned to match the predominant heave frequency of the ship, thereby exciting the cable system producing maximum dynamic tension variations in the cable. The tension variations force the floating sheaves to move along the guide posts in an oscillatory or reciprocating manner, thus extracting the maximum amount of energy from the waves.

20 Claims, 5 Drawing Figures

DYNAMIC WAVE ENERGY EXTRACTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to ocean wave energy extraction systems which change the force of ocean waves into usable energy.

2. Description of the Prior Art

Offshore activities including oil exploration and well drilling are now quite common owing to the ever-increasing demand for petroleum products, food, etc. These offshore activities often involve the use of ships, floating barges or other specially designed craft for supporting equipment and crews. Many offshore craft are relatively large, weighing on the order of several thousand tons and have living quarters for the crew who may live onboard for a long period of time. A floating offshore station of this kind obviously requires much electrical power for operating equipment as well as lighting and perhaps heating the station, particularly the crew's quarters. Heretofore, petroleum fuel has been used as the main energy source and power supply for shipboard power. The heat engine employed was usually a diesel engine which was noisy, polluting and expensive to operate.

One prior art power generating system utilizes ship motion energy by means of cables affixed to the seafloor. However, this device suffers from the effect of operations by change in the height of the sea level.

The present invention may be utilized to serve as a power supply plant for undersea diver constructions, for providing auxiliary ship power supplements, or for providing power to remote locations. In addition to the generation of electrical power, it is envisioned that the present invention may produce other forms of power or energy such as to operate pumps, gas compressors or derive a variety of mechanical devices.

SUMMARY OF THE INVENTION

A general purpose of the present invention is to provide a dynamic wave extraction system which is independent of the position of the floating ship and of the depth of the sea. Accordingly, one embodiment of the present invention provides a spring-biased floating sheave disposed to move with respect to a pair of guide posts attached to a ship. A cable having one end attached to the ship and the other end attached to a submerged inertia weight passes across the sheave. As the waves impart motion to the ship, the inertia of the submerged weight imparts a reciprocating motion to the sheave with respect to the ship, thus generating motion which may be translated into power. The spring, cable and inertia weight are tuned to match the predominant motion frequency of the ship to reach a resonant condition, thereby exciting the cable to produce maximum dynamic tension variations in the cable so that maximum power is generated.

Accordingly, one object of the present invention is to provide a floating power generating station which effectively translates the wave energy in a body of water into useful energy such as electrical power.

Another object of the present invention is to provide a floating, wave-driven power generating station of the character described which may be designed for use as an offshore well drilling station, as a power supply for undersea diver constructions, or auxiliary ship power supplements for supplying power to remote locations.

Another object of the present invention is to provide a floating, wave-driven power generating station of the character described which is relatively simple in construction, reliable in operation, and otherwise ideally suited for its intended purposes.

A still further object of the present invention is to provide a wave energy extraction system whose operation is independent of a position of a floating ship and of the depth of the sea.

A further object of the present invention is to provide an energy dissipation system which, when used singly or in multiple, stabilizes the ship motion in waves.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

DETAILED DESCRIPTION OF THE PREFERRED EMBODIMENT

Figure 1:
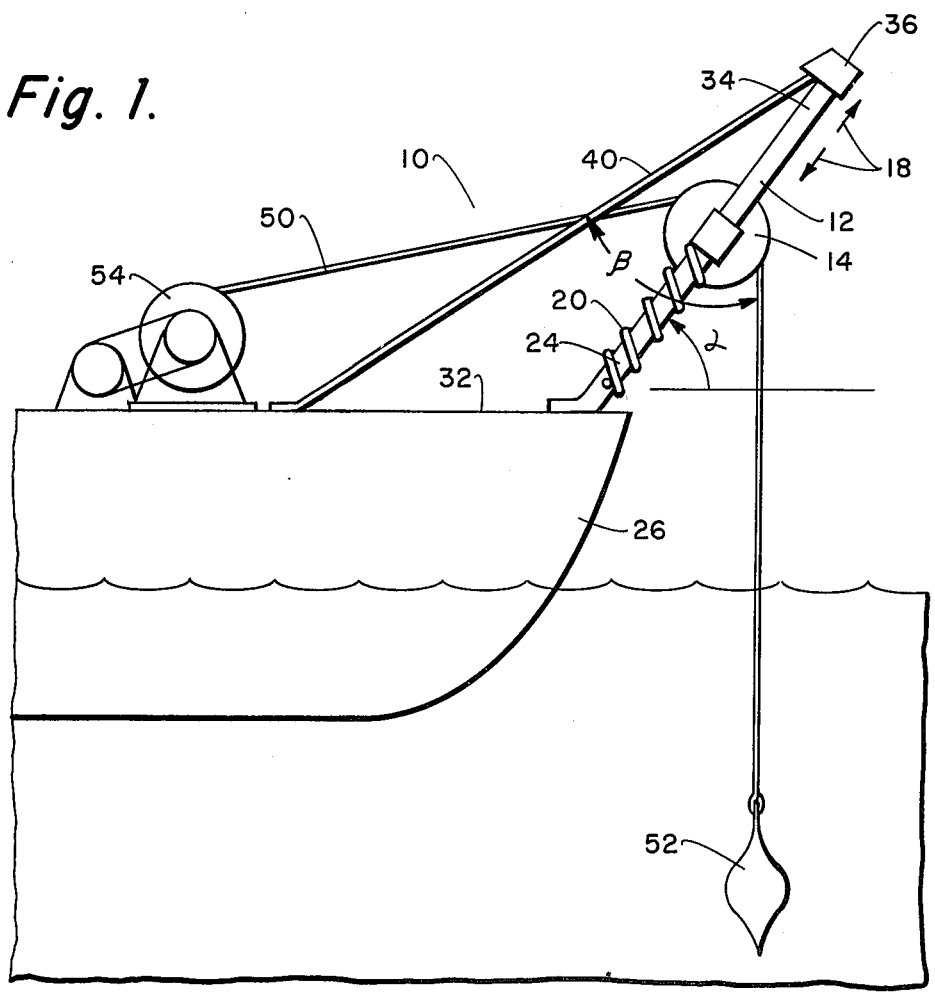
FIG. 1 illustrates an embodiment of the present invention attached to a ship.
Figure 2:
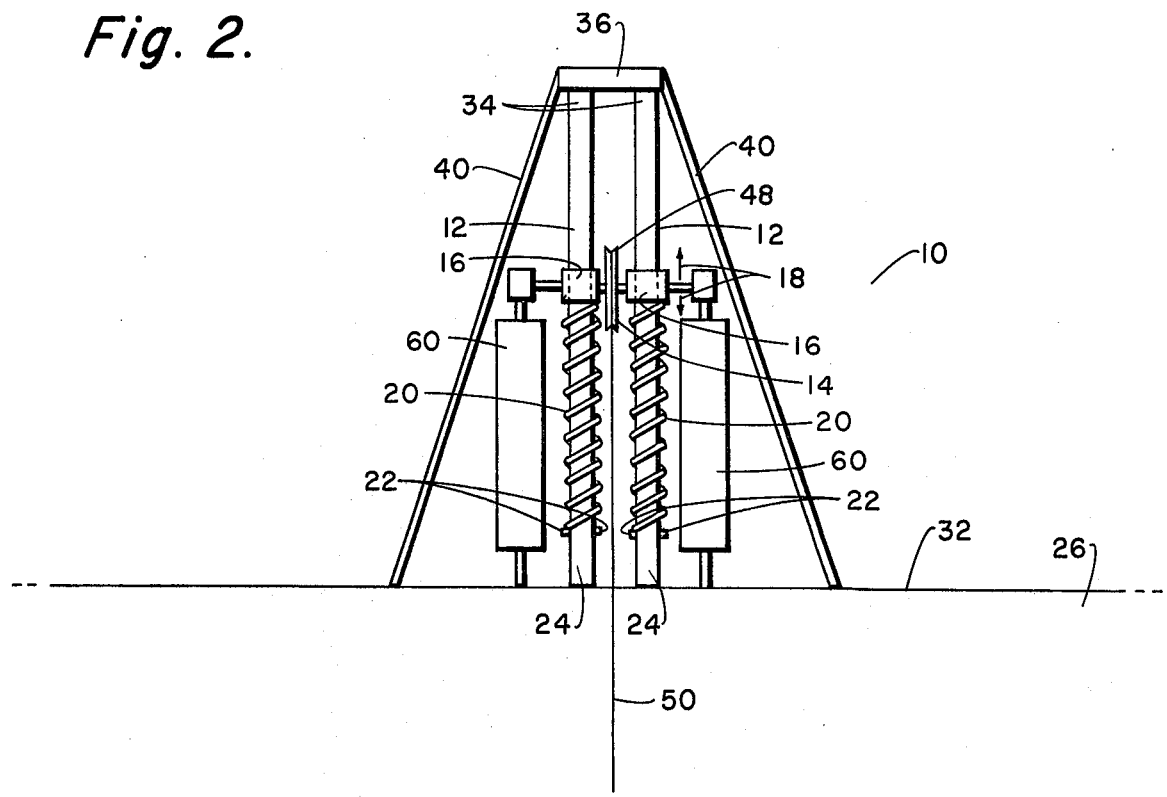
FIG. 2 illustrates a front view of the embodiment shown in FIG. 1.

Referring now to FIGS. 1 and 2, one embodiment 10 of the dynamic wave energy extraction system is illustrated. A pair of guide posts 12 support a floating sheave 14. Sheave 14 is rotatably mounted between a pair of sliding blocks 16. Each block 16 is provided with an orifice therethrough which enables each block 16 to slide up or down guide posts 12 in the directions indicated by arrows 18.

Springs 20 are disposed to wrap around each guide post 12 abutting each slidable block 16 on the bottom surface thereof at one end and abutting stops 22 at the other end. Stops 22 are rigidly affixed to guide posts 12.

Each guide post 12 is rigidly affixed to the ship deck 26 at lower end 24. Each guide post 12 is rigidly affixed at end 34 to support member 40 and top support member 36. The lower end of support member 40 is rigidly affixed to deck 32 to form a stable "A" frame.

It is noted that guide posts 12 extend from the edge of deck 32 outwardly at an inclined angle $\alpha$. The inclined angle $\alpha$ should be approximately 45 degrees such that the guide posts 12 should bisect the enclosed angle $\beta$ formed between the lift cable 50 before and after passing over the sheave 14.

Cable 50 is disposed to lie within groove 48 of sheave 14. Cable 50 is connected at one end to inertia weight 52 and at the other end to winch mechanism 54. Winch mechanism 54 is rigidly affixed to deck 32 of ship 26. Winch mechanism 54 varies the length of cable 50.

As the waves impart motion to ship 26, weight 52 imparts dynamic force to cable 50. At resonance, weight 52 will impart maximum dynamic forces to cable 50. As a result, oscillatory or reciprocating motion with respect to ship 26 is imparted to sheave 14 in the direction indicated by arrows 18 along guide posts 12.

The vertical position x, the vertical velocity dx/dt and the vertical acceleration $d^2x/dt^2$ of the ship motion caused by the waves (assuming sinusoidal wave motion) are given by the following formulae:

$$X = H \sin \frac{2\pi t}{T}$$
$$\frac{dx}{dt} = \frac{2\pi H}{T} \cos \frac{2\pi t}{T}$$
$$\frac{d^2x}{dt^2} = - \frac{4\pi^2 H}{T^2} \sin \frac{2\pi t}{t}$$

where H is the amplitude of vertical displacement and T is the ship period.

Assuming sinusoidal wave motion as above, ship 26 will exhibit a predominant frequency of motion imparted thereto by the wave force. In addition, the cable system comprising cable 50, sheave 14, springs 20, and inertia weight 52 exhibit a natural frequency. To obtain the maximum movement of sheave 14 with respect to guide posts 12 and, hence, maximum energy extraction from the waves, the natural frequency of the cable system is matched to the predominant frequency of ship 26, i.e., resonance condition. This matching process is accomplished by varying the length of cable 50 until the maximum undulations or oscillations of sheave 14 with respect to guide posts 12 are observed. It is noted that springs 20 exhibit spring constants capable of absorbing the maximum of the forces imparted thereto when contracting while still remaining elastic and then returning sheave 14 to its initial position when the forces return to zero.

The natural frequency of a cable system is calculated as follows:

$$f_n = \sqrt{K/M}$$

where:
K = Spring constant of springs 20 and cable 50
M = Total virtue mass of the suspended weight.
To reach the resonance condition, either the spring constant K or the suspended mass M may be selected to make $$f_n = 1/T$$

where T is the ship period.

As discussed supra, one method of tuning the system to its resonance condition is to vary the suspension depth of the weight 52 until the sheave motion reaches maximum amplitude.

For maximum tension variation, the fluid damping must be kept minimal. This is accomplished by shaping the weight in streamline fashion, as illustrated by weight 52 of FIG. 1, to reduce drag in the vertical direction.

Figure 3:
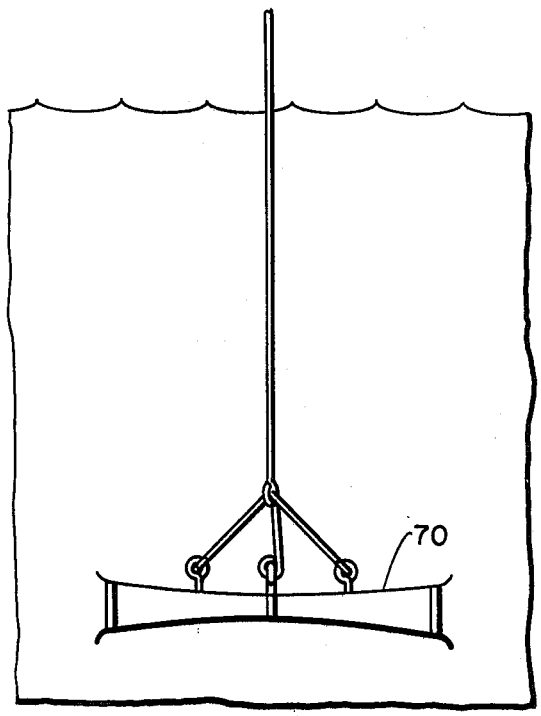
FIG. 3 illustrates an alternative shape of the inertia weight illustrated in FIG. 1.

In some cases, such as in shallower depths, where the resonance condition cannot be reached with a low drag body, a high drag body such as the one shown in FIG. 3, should be used to minimize the weight motion to achieve maximum energy extraction. Since the high drag body system responses are non-selective to frequency, it is best suited for highly random waves.

Figure 4:
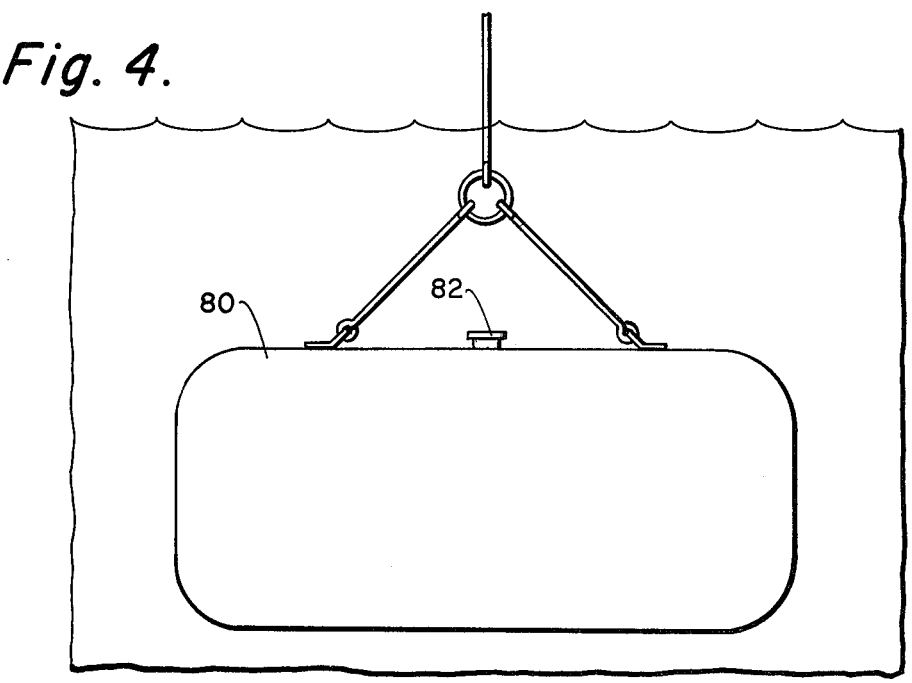
FIG. 4 illustrates an alternative shape of the inertia weight shown in FIG. 1.

In cases where a heavy weight is not available, or whenever a heavy weight cannot be handled by the deck equipment, a ballasted tank like that shown in FIG. 4 may be used to provide maximum mass with minimum in-air weight. Such weight, when properly tuned, can be almost as effective as a solid weight.

Under certain sea conditions when the resonance condition is established, the forces imparted to cable 50 by inertia weight 52 becomes so great that sheave 14 may exceed its limits, i.e., spring 20 cannot absorb the forces exerted upon them and still remain elastic. In such situations, the cable system may be tuned such that the displacement of sheave 14 is just short of the maximum. That is, such that springs 20 can absorb the forces exerted upon them and still remain elastic.

The reciprocal or oscillating motion imparted to sheave 12 by cable 50 can be utilized to generate power and store the generated energy in a desired form. Power generators 60 are shown connected to slidable blocks 16 via rods 62. Power generating devices 60 are rigidly affixed to deck 32 of ship 26. The specific details of power generating devices 60 are not illustrated as such devices are well known to those having ordinary skill in the art.

Figure 5:
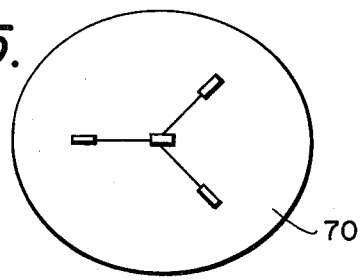
FIG. 5 is a top view of the inertia weight shown in FIG. 3.

Inertia weights 52 may be of a variety of sizes, materials and shapes. An alternative inertia weight 70 is shown in FIGS. 3 and 5. Inertia weight 70 is disc-shaped so as to provide maximum drag to reduce the motion of weight 70. This weight is useful where amplification of sheave motion is not needed such as in high sea state conditions or in shallow depth. Inertia weight 70 produces a reduced relative motion between the ship and inertia weight 70. FIG. 5 is a top view of inertia weight 70.

FIG. 4 illustrates inertia weight 80. Inertia weight 80 provides a large mass by utilizing a lightweight, large volume pontoon. The large mass of inertia weight 80 is crested by ballasting the pontoon with the proper amount of seawater inserted through opening 82. The large mass of inertia weight 80 lowers the natural frequency of the cable system which minimizes the motion of inertia weight 80. The weight of inertia weight 80 is adjustable by inserting the desired amount of water as ballast.

Obviously numerous modifications and variations of the present invention are possible in light of the above teachings. It is therefore to be understood that within the scope of the appended claims the invention may be practiced otherwise than as specifically described herein.

What is claimed is:

1. A dynamic wave energy extraction system comprising:
   a. a buoyant body adapted to float on a body of water, said buoyant body having a predominant frequency of motion imparted thereto by surface wave movement;
   b. spring bias means connected to said buoyant body including:
      (1) a sheave support member attached to said buoyant body;
      (2) a sheave slidably mounted on said support member; and
      (3) a spring connected between said sheave and said buoyant body;
   c. inertia means movably mounted to said sheave for applying forces in response to the motion of said buoyant body to said sheave of spring bias means, said spring bias means elastically countering said applied forces such that said sheave of spring bias means experiences oscillating movement with respect to said buoyant body, said spring bias means and said inertia means having a natural frequency.

2. The apparatus of claim 1 further including tuning means connected between said inertia means and said buoyant body for tuning said natural frequency to said predominant frequency.

3. The apparatus of claim 1 wherein said inertia means includes:
   a. a submerged inertia body downwardly spaced from said buoyant body; and
   b. flexible means connected between said buoyant body and said inertia body, said flexible means communicating said forces to said spring bias means.

4. The apparatus of claim 3 wherein said flexible means includes a cable.

5. The apparatus of claim 3 further including means connected between said flexible means and said buoyant body for tuning said natural frequency to said predominant frequency.

6. The apparatus of claim 5 wherein said tuning means includes winch means for varying the length of said flexible means.

7. The apparatus of claim 3 wherein said inertia body is a prolate spheroid shape.

8. The apparatus of claim 3 wherein said inertia body is a disc shape thereby creating drag with the water.

9. The apparatus of claim 3 wherein said inertia body is a lightweight, large volume pontoon ballasted with water.

10. The apparatus of claim 1 further including power means coupled to said spring bias means for converting movement therefrom into useful power.

11. A dynamic wave energy extraction system comprising:
   a. a buoyant body adapted to float on a body of water, said buoyant body having a predominant frequency of motion imparted thereto by surface wave movement;
   b. spring bias means connected to said buoyant body;
   c. inertia means connected to said buoyant body for applying forces in response to the motion of said buoyant body to said spring bias means including:
      (1) a submerged inertia body downwardly spaced from said buoyant body; and
      (2) flexible means connected between said buoyant body and said inertia body, said flexible means communicating said forces to said spring bias means;
   d. said spring bias means elastically countering said applied forces such that said spring bias means experiences oscillating movement with respect to said buoyant body, said spring bias means and said inertia means having a natural frequency.

12. The apparatus of claim 11 further including tuning means connected between said inertia means and said buoyant body for tuning said natural frequency to said predominant frequency.

13. The apparatus of claim 11 wherein said spring bias means includes:
   a. a sheave support member attached to said buoyant body;
   b. a sheave slidably mounted on said support member, said inertia means being movably mounted to said sheave and communicating said forces to said sheave;
   c. a spring connected between said sheave and said buoyant body.

14. The apparatus of claim 11 wherein said flexible means includes a cable.

15. The apparatus of claim 11 further including means connected between said flexible means and said buoyant body for tuning said natural frequency to said predominant frequency.

16. The apparatus of claim 15 wherein said tuning means includes winch means for varying the length of said flexible means.

17. The apparatus of claim 11 wherein said inertia body is a prolate spheroid shape.

18. The apparatus of claim 11 wherein said inertia body is a disc shape, thereby creating drag with the water.

19. The apparatus of claim 11 wherein said inertia body is a lightweight, large volume pontoon ballasted with water.

20. The apparatus of claim 11 further including power means coupled to said spring bias means for converting movement therefrom into useful power.

* * * * *